(12) United States Patent
McGill et al.

(10) Patent No.: US 7,203,738 B1
(45) Date of Patent: Apr. 10, 2007

(54) SYSTEM AND METHOD FOR DISTRIBUTING APPLICATION OBJECTS

(75) Inventors: Kevin S. McGill, Elk Ridge, UT (US); Hong Zhu, Provo, UT (US); Mark E. Roberts, Woodland Hills, UT (US); Ty H. Ellis, Elk Ridge, UT (US); Steve P. Townsend, American Fork, UT (US); David A. Romanek, Payson, UT (US)

(73) Assignee: Novell, Inc., Provo, UT (US)

( * ) Notice: Subject to any disclaimer, the term of this patent is extended or adjusted under 35 U.S.C. 154(b) by 730 days.

(21) Appl. No.: 10/175,811

(22) Filed: Jun. 21, 2002

Related U.S. Application Data

(60) Provisional application No. 60/364,026, filed on Mar. 15, 2002.

(51) Int. Cl.
*G06F 15/16* (2006.01)
*G06F 9/44* (2006.01)

(52) U.S. Cl. .................. 709/219; 709/245; 717/171

(58) Field of Classification Search ............. 709/245, 709/220–222, 202; 717/168–178
See application file for complete search history.

(56) References Cited

U.S. PATENT DOCUMENTS

| | | | | |
|---|---|---|---|---|
| 5,692,129 A | * | 11/1997 | Sonderegger et al. ... | 707/103 R |
| 5,692,183 A | | 11/1997 | Hapner et al. .............. | 395/614 |
| 5,727,203 A | | 3/1998 | Hapner et al. .............. | 395/614 |
| 5,793,982 A | * | 8/1998 | Shrader et al. ............. | 709/232 |
| 5,812,669 A | * | 9/1998 | Jenkins et al. ............. | 713/161 |
| 5,848,419 A | | 12/1998 | Hapner et al. .............. | 707/103 |
| 5,867,713 A | * | 2/1999 | Shrader et al. ............. | 717/176 |
| 5,870,611 A | * | 2/1999 | London Shrader et al. . | 717/175 |
| 5,875,296 A | | 2/1999 | Shi et al. ................ | 395/188.01 |
| 6,023,586 A | * | 2/2000 | Gaisford et al. ............ | 717/178 |
| 6,029,246 A | * | 2/2000 | Bahr ............................. | 726/4 |
| 6,115,549 A | | 9/2000 | Janis et al. | |
| 6,154,747 A | | 11/2000 | Hunt ........................ | 707/100 |
| 6,324,578 B1 | * | 11/2001 | Cox et al. ................... | 709/223 |
| 6,463,454 B1 | | 10/2002 | Lumelsky et al. .......... | 709/105 |

(Continued)

OTHER PUBLICATIONS

Del-Fabbro et al., "Data Management in Grid Applications Providers", *IEEE*, 2005, Proceedings of the First International Conference on Distribution Frameworks for Multimedia Applications (DFMA'05), 8 pages.

(Continued)

*Primary Examiner*—David Wiley
*Assistant Examiner*—Joseph E. Avellino
(74) *Attorney, Agent, or Firm*—Pillsbury Winthrop Shaw Pittman, LLP

(57) ABSTRACT

A system and method for subscribing to a distribution by a subscriber which distributes a distribution package from a source database to a destination database. The system/method includes accessing a subscriber object upon receiving a distribution package distributed by a distributor, determining a working-context stored within the subscriber object, selecting a first object included in the distribution package, obtaining from the package a relative identifier for the first object or creating the relative identifier for the first object if the relative identifier is not included with the package, appending the relative identifier to the working-context, wherein a second identifier is created for the selected object and adding the selected object with the second identifier to the destination database.

25 Claims, 7 Drawing Sheets

U.S. PATENT DOCUMENTS

| | | | |
|---|---|---|---|
| 6,516,354 B2 | 2/2003 | Cavanaugh | 709/316 |
| 6,636,585 B2 | 10/2003 | Salzberg et al. | 379/22 |
| 6,662,230 B1 | 12/2003 | Eichstaedt et al. | 709/229 |
| 6,678,355 B2 | 1/2004 | Eringis et al. | 379/22 |
| 6,829,770 B1* | 12/2004 | Hinson et al. | 719/318 |
| 6,862,616 B1* | 3/2005 | Tompkins | 709/223 |
| 6,922,723 B1* | 7/2005 | Sharp et al. | 709/221 |
| 2002/0055972 A1 | 5/2002 | Weinman, Jr. | 709/203 |
| 2002/0066022 A1* | 5/2002 | Calder et al. | 713/200 |
| 2002/0073245 A1* | 6/2002 | Hallford | 709/331 |
| 2002/0100035 A1* | 7/2002 | Kenyon et al. | 717/168 |
| 2002/0138582 A1 | 9/2002 | Chandra et al. | 709/206 |
| 2003/0028489 A1 | 2/2003 | Williamson | 705/59 |
| 2003/0061323 A1* | 3/2003 | East et al. | 709/223 |

OTHER PUBLICATIONS

Misra et al., "CLASH: A Protocol for Internet-Scale Utility-Oriented Distributed Computing", *IEEE*, 2004, Proceedings of the 24th International Conference on Distributed Computing Systems (ICDCS'04), 9 pages.

Sousa et al., "Object Identifiers and Identity: A Naming Issue", *IEEE*, INESC-I.S.T., 1995, pp. 127-129.

"Automatice Software Distribution of Java Applications", http://www.javaworld.com/javaworld/jw-05-1996/jw-05-westerkamp.html. printed Mar. 4, 2002, 9 pages.

* cited by examiner

SYSTEM AND METHOD FOR DISTRIBUTING APPLICATION OBJECTS

This application claims the benefit of U.S. Provisional Patent Application No. 60/364,026, filed on Mar. 15, 2002, the contents of which are incorporated herein.

CROSS REFERENCE TO RELATED APPLICATIONS

This application is related to the following commonly owned U.S. patent applications, all of which are hereby incorporated by reference into the present application: (1) U.S. patent application Ser. No. 10/175,843, filed on even data herewith, entitled "System and Method for Distributing Selected Objects From a Source Database to a Destination Database," and (2) U.S. patent application Ser. No. 10/175,877, filed on even data herewith, entitled "System and Method for Distributing a Selected Object."

BACKGROUND OF THE INVENTION

1. Field of the Invention

The present invention is related to the field of distributing application objects.

2. Discussion of the Background

Distribution of software has become an industry within an industry. Manufacturers of software products have the difficult task of distributing software products to system administrators. And system administrators have the difficult task of maintaining synchronization of software versions across the network of computers that they administer.

Application launching systems have been developed in an attempt to address the software distribution and maintenance needs of system administrators. Such systems are client/server systems. The server stores one or more software applications. The server also has a database in which there is stored an application object for each of the one or more software applications that the server stores. That is, each software application has a corresponding application object that is stored in the database. The application object includes information about its corresponding software application. The information may include the file name of an executable file that stores the software application as well as other information related to the software application. A client application called an Application-Launcher resides on a user's desktop computer. The Application-Launcher transmits the user's logon information to the server, which uses the information to determine the application objects that are associated with the user. The server then transmits to the Application-Launcher the software that corresponds to the determined application objects. In this way, the software applications can be stored and maintained in a central location and then automatically distributed to the end user.

In a large organization, new servers are often being connected to the organization's network. A system for easily distributing the organization's software and related application objects to these new servers is required.

SUMMARY OF THE INVENTION

The present invention provides a system and method for distributing application objects and the software and other information associated with the application objects. The system/method allows administrators to create a distribution by selecting one or more application objects for distribution. Once the distribution is defined, the distribution can be used any number of times and be sent to any number of destination databases without having to re-define or modify the distribution. Advantageously, the system/method automatically determines the application objects that are associated with the application objects selected for distribution by the administrator and automatically distributes the selected application objects together with the application objects that are associated with the selected application objects. Other advantages exist.

In one aspect, a system according to one embodiment of the present invention includes a distributor server and a subscriber server. The distributor server executes a first software module that is referred to as the "Distributor" and a second software module that is referred to as the "Distributor Agent." The subscriber server executes a software module that is referred to as the "Subscriber."

The Distributor Agent allows an administrator (or other user) to define a distribution to be distributed to Subscribers. That is, the Distributor Agent allows the administrator to select for distribution one or more application objects that are stored in a database (also referred to as "source database"). The source database may be a hierarchical database, such as a directory or other hierarchical database. The Distributor Agent may also allow the administrator to specify: (a) whether the source database structure should be maintained at the destination, (b) a build time, and/or (c) a distribution time. If the administrator specifies that the source database structure should be maintained, then the administrator must specify a source-root-context. The source-root-context is the distinguished name (DN) of a node within the source database. If the administrator specifies a source-root-context, then the administrator selects for distribution those application objects that are within the source-root-context.

After the administrator defines the distribution, the Distributor Agent creates a distribution object that corresponds to the defined distribution and stores the distribution object in a database. For each application object that the administrator selected for distribution, the distribution object contains the application object's DN. Thus, the distribution object contains a list of DNs (i.e., one DN for each application object selected for distribution). Also included in the distribution object is the source-root-context, build time, and/or distribution time, if any, specified by the administrator.

In one embodiment, in defining a distribution, the administrator does not specify any information concerning the Subscriber. Thus, no Subscriber information is stored in the distribution object. Rather, information concerning the Subscriber is stored in a separate object called a "subscriber object," which is described below. This feature enables the distribution to be sent to more than one Subscriber without having to re-define or modify the distribution. This provides a certain amount of flexibility that conventional distribution systems do not provide.

Referring now to the Distributor, the Distributor is operable to retrieve a distribution object from the database, build a distribution package based on the distribution object, determine the one or more Subscribers that are subscribed to (i.e., associated with) the distribution object, and distribute the distribution package to the one or more Subscribers.

In one embodiment, the process performed by the Distributor for building a distribution package includes the following: (a) select a DN from the DN list included in the retrieved distribution object; (b) retrieve from the source database the application object referenced by the selected DN; (c) create for the application object a relative DN (RDN) based on the selected DN (the process of creating an RDN is described in the following paragraph); (d) store in the distribution package the object along with its RDN; (e) examine the object's file related attributes to determine the files that are associated with the object (for example, the executable file that stores the software that corresponds to the object), and include those files in the distribution package; (f) determine all of the application objects that are associated with the object in question (these associated application objects may include one or more fail-over application objects and one or more chained application objects); (g) include in the distribution package the files associated with the application objects determined in step (f); (h) for each application object determined in step (f): create an RDN for the object and store in the distribution package the object along with its RDN; (i) determine whether all of the DNs in the DN list have been selected; (j) if all have not been selected, select another DN from the list and repeat steps (b)–(j); and (k) if the administrator specified a source-root-context, then include the source-root-context in the distribution package.

An RDN for an object is determined as follows. If the administrator specified a source-root-context, then the RDN is the difference between the source-root-context and the object's DN. For example, if the source-root-context is "Novell.US" and if the DN of the object is: "object1.Engineering.Novell.US," then the RDN for that object will be "object1.Engineering". But, if the administrator specify not to maintain the database structure, then the relative DN is simply the last component of the object's DN. Using the above example, if the administrator did not specify a source-root-context, then the RDN for the object in question is simply: "object1".

Referring now to the Subscriber, the Subscriber has a corresponding subscriber object stored in a database. A subscriber object defines the properties for its corresponding Subscriber and contains information concerning the Subscriber, such as the network address and/or domain name of the subscriber server on which the Subscriber executes and/or other information concerning the Subscriber. The subscriber object also contains a working-context. The working-context is the DN of a node within a destination database where application objects are to be stored and to which the Subscriber has access. Like the source database, the destination database may be a hierarchical database, such as a directory or other hierarchical database.

In one embodiment, a Subscriber is subscribed to a distribution by associating the Subscriber's subscriber object with the distribution's distribution object. Thus, in one embodiment, the Distributor determines the Subscribers that are subscribed to a distribution by determining the subscriber objects that are associated with the distribution's distribution object.

Upon receiving a distribution package distributed by the Distributor, a Subscriber accesses its subscriber object to determine the working-context stored in the subscriber object. After determining the working-context, the Subscriber selects an object included in the package, obtains from the package the selected objects relative DN or creates a relative DN for the object if a relative DN for the object is not included in the package (the Subscriber uses the same method as the Distributor for creating the relative DN), and appends the object's relative DN to the working-context, thereby creating a new DN for the selected object.

The selected object with the new DN is then added to the destination database. If any part of the new DN does not exist in the destination database, then the Subscriber will create the appropriate container objects and add them to the destination database so that the selected application object can be added to the destination database without error.

Additionally, the Subscriber modifies the selected application object's attributes as needed to accommodate the new environment in which the selected object is stored. For example, if the selected application object contains an attribute that includes a DN of an object associated with the selected application object, then the Subscriber creates a new DN and sets the attribute to the new DN.

After selecting an application object from the distribution package and performing the steps describe above, the Subscriber repeats the above described process until all application objects in the distribution package have been selected and added to the destination database. Further, the Subscriber stores onto a non-volatile storage medium (e.g., the subscriber server's hard disk or other storage medium) the files included in the distribution package.

Because the Distributor automatically determines the application objects that are associated with the application objects selected for distribution by the administrator and automatically includes those objects in the distribution package, the administrator is relieved of the burden of specifying each application object that is associated with the application objects selected for distribution. This not only makes the administrator's job much easier, but also ensures that all of the application objects associated with the application objects selected for distribution are distributed along with the objects, thereby ensuring that there are no missing dependencies in the distribution.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
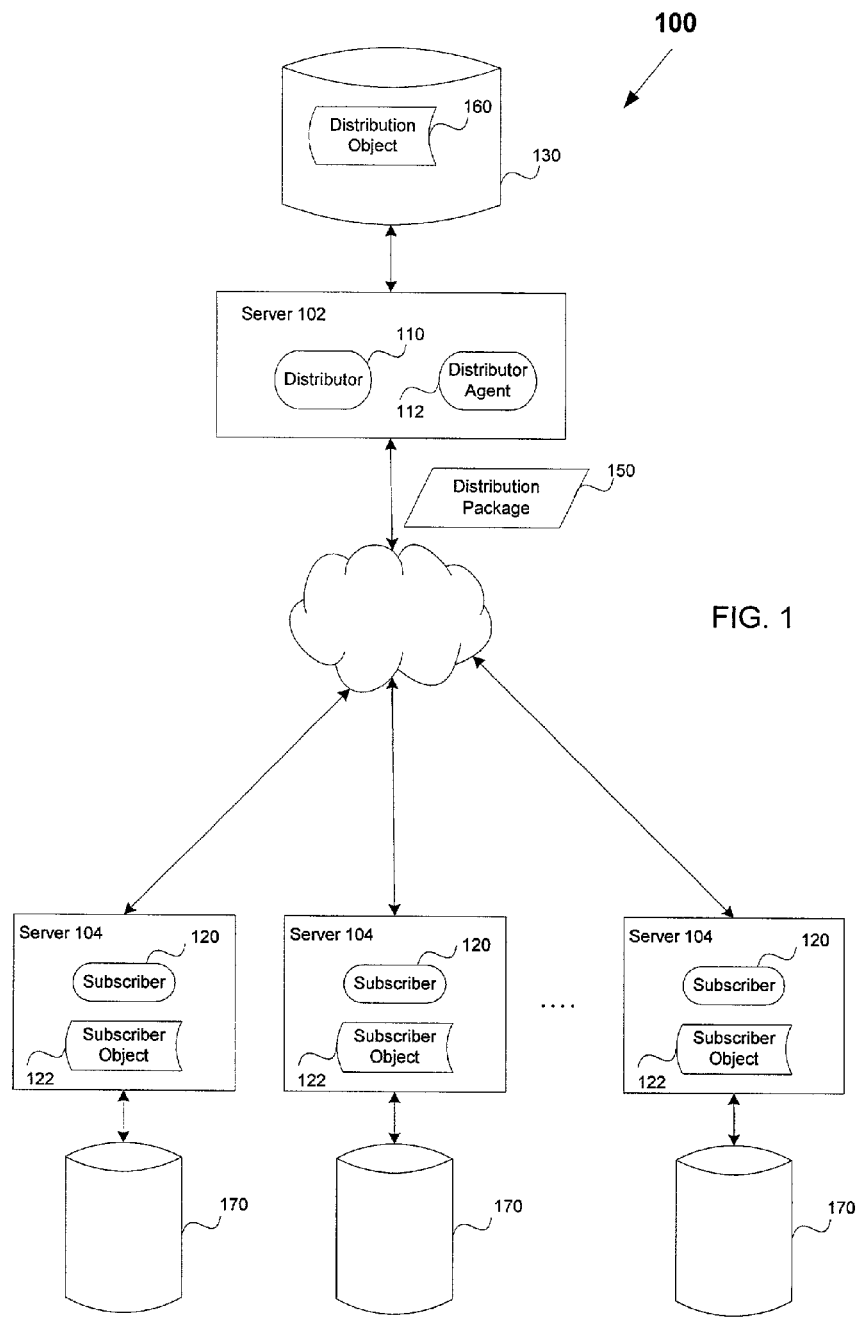
FIG. 1 is a functional block diagram of an object distribution system according to one embodiment of the invention.

FIG. 1 is a functional block diagram of an application object distribution system 100, according to one embodiment of the invention, for distributing application objects to subscribers. An application object comprises a set of information. System 100 includes a distributor server 102 and one or more subscriber servers 104. Distributor server 102 includes a first software module 110 (referred to as Distributor 110) and a second software module 112 (referred to as Distributor Agent 112). Subscriber server 104 includes a software module 120 (referred to as Subscriber 120). Although Distributor 110 and Distributor Agent 112 are shown as being separate software modules, one skilled in the art will appreciate that they could be combined into a single software module. Additionally, one skilled in the art will appreciate that any of the software modules described herein could be implemented as a single software module or as multiple software modules. Similarly, one skilled in the art will appreciate that system 100 may include any number of distributor servers 102.

Each Subscriber 120 has a corresponding subscriber object 122. Each Subscriber object 122 contains information concerning its corresponding Subscriber 120, such as the network address and/or domain name of the subscriber server 104, on which the Subscriber 120 executes, and/or other information concerning the Subscriber 120. Each Subscriber object 122 also contains a working-context. The working-context is the DN of a node within a destination database 170 to which the Subscriber 120 has access. The destination database 170 may be a hierarchical database, such as a directory or other hierarchical database.

Distributor Agent 112 allows an administrator to define a distribution to be distributed to one or more Subscribers 120. That is, Distributor agent 112 allows the administrator to select for distribution one or more application objects that are stored in a source database 130. Like destination database 170, source database 130 may be a hierarchical database, such as a directory or other hierarchical database. Distributor agent 112 may also allow the administrator to specify (a) whether the structure of database 130 should be maintained at the destination databases, (b) a build time, and/or (c) a distribution time.

If the administrator specifies that the structure of database 130 should be maintained at the destination databases, then the administrator specifies a source-root-context. The source-root-context is the distinguished name (DN) (also referred to as "pathname") of a node within source database 130. If the administrator specifies a source-root-context, then the administrator selects for distribution those application objects that are within the source-root-context.

After the administrator defines the distribution, Distributor agent 112 creates a distribution object 160 that corresponds to the defined distribution and stores the distribution object in a database (e.g., database 130 or another database). For each application object that the administrator selected for distribution, Distributor agent 112 includes in the distribution object 160 the selected application object's DN. Thus, the distribution object 160 contains a list of DNs (i.e., one DN for each application object selected for distribution). Also included in the distribution object 160 is the source-root-context, build time, and/or distribution time, if any, specified by the administrator. Additionally, if the administrator specifies that database structure should be maintained and/or object associations should be maintained, then the maintain database structure and the maintain-object-association flags in distribution object 160 are set to TRUE.

In one embodiment, in defining a distribution, the administrator does not specify any information concerning the final destination(s) (i.e., Subscribers 120) of the distribution. Thus, no Subscriber information is stored in the distribution object 160. Rather, the Subscriber information is stored in one or more subscriber objects. This feature enables the distribution to be sent to more than one Subscriber 120 without having to re-define the distribution or modify the distribution object 160. This provides a certain amount of flexibility that conventional distribution systems do not provide.

Referring now to Distributor 110, Distributor 110 is operable to retrieve a distribution object from wherever it is stored, build a distribution package 150 based on the distribution object, determine the one or more Subscribers 120 that are subscribed to the distribution corresponding to the distribution object, and distribute distribution package 150 to the one or more Subscribers 120. In one embodiment Distributor 110 distributes a distribution package 150 by transmitting it to a Subscriber 120.

Figure 2A:
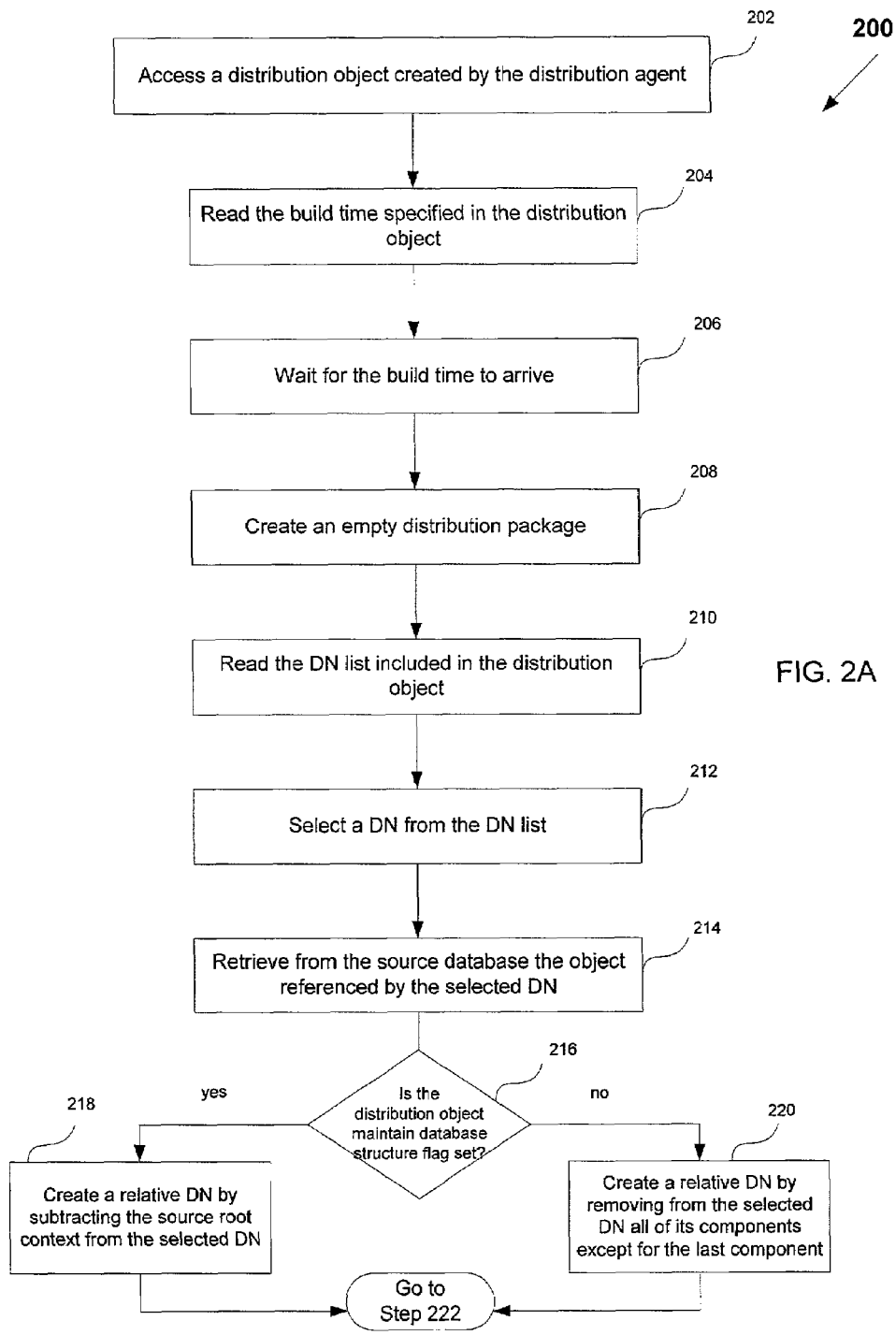
FIGS. 2A and 2B are a flow chart illustrating a process according to one embodiment of the invention.
Figure 2B:
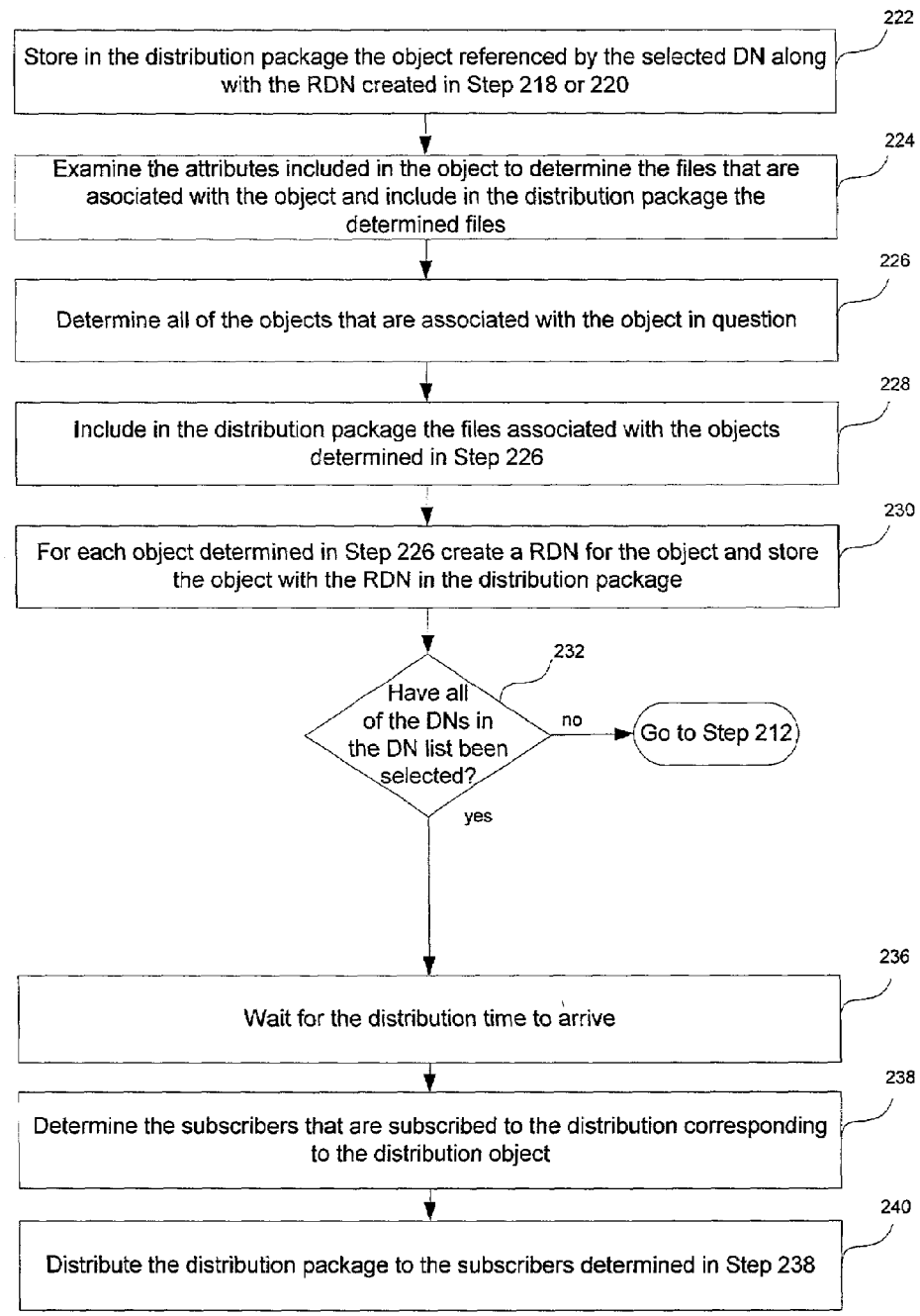

FIG. 2 is a flow chart illustrating a process 200 that is performed by Distributor 110. Process 200 begins in step 202, where Distributor 110 accesses a distribution object 160 created by Distribution Agent 112. In step 204, Distributor 110 reads the build time specified in distribution object 160. In step 206, Distributor 110 waits for the build time to arrive. Once the build time is reached, control passes to step 208.

In step 208, Distributor 110 creates an empty distribution package 150. In step 210, Distributor 110 reads the DN list included in distribution object 160. In step 212, Distributor 110 selects a DN from the DN list. In step 214, Distributor 110 retrieves from source database 130 the application object referenced by the selected DN. In step 216, Distributor 110 determines whether distribution object 160 maintain database structure flag is set. If distribution object 160 maintain database structure flag is set, control passes to step 218, otherwise control passes to step 220.

In step 218, Distributor 110 creates a relative DN (RDN) by subtracting the source-root-context from the selected DN. For example, if the source-root-context is "Novell.US" and if the selected DN is: "object1.Engineering.Novell.US", then the RDN is: "object1.Engineering." In step 220, Distributor 110 creates an RDN by removing from the selected DN all of its components except for the last component. Using the above example, if distribution object 160 does not include a source-root-context, then the RDN is simply: "object1". In step 222, Distributor 110 stores in the distribution package 150 the application object referenced by the selected DN along with the RDN created in step 218 or 220. In one embodiment, steps 218 and 220 can be skipped. In this embodiment, step 222 is changed so that Distributor 110 stores in the distribution package 150 the object referenced by the selected DN along with the selected DN.

In step 224, Distributor 110 examines attributes included in the application object to determine the files (e.g., data files, executable files, and other files) that are associated with the application object and includes in the distribution package the determined files.

In step 226, Distributor 110 determines all of the application objects that are associated with the application object. These objects may include chained and fail-over application objects. In step 228, Distributor 110 includes in the distribution package the files associated with the application objects determined in step 226. In step 230, Distributor 110, for each application object determined in step 226, creates an RDN for the application object and stores the application object with the RDN in the distribution package (the RDN will either be the object's DN minus the source-root-context or the last component of the object's DN depending on whether a source-root-context is included in the distribution object).

In step 232, Distributor 110 determines whether all of the DNs in the DN list have been selected. If all have not been selected, control passes back to step 212, where Distributor 110 selects from the list another DN that has not already been selected.

In step 236, Distributor 110 determines the Subscribers 120 that are subscribed to the distribution corresponding to distribution object 160. In one embodiment, a Subscriber 120 is subscribed to a distribution by associating the Subscriber's subscriber object with the distribution's distribution object. Thus, in step 236, Distributor 110 determines the Subscribers 120 that are subscribed to a distribution by determining the subscriber objects 122 that are associated with the distribution object 160. Distributor 110 distributes distribution package 150 to the Subscribers 120 determined in step 236. After step 236, Distributor 110 may select another distribution object and repeat the above process.

Upon receiving distribution package 150 distributed by Distributor 110, a Subscriber 120 accesses its subscriber object 122 to determine the working-context stored in the subscriber object. After determining the working-context, the Subscriber 120 selects an object included in distribution package 150, creates a relative DN for the selected object if one is not included in package 150, and appends the object's relative DN to the working-context, thereby creating a new DN for the selected object. The selected application object with the new DN is then added to the Subscriber's destination database 170. If any part of the new DN does not exist in the destination database 170, then the Subscriber 120 will create the appropriate container objects and add them to the destination database 170 so that the selected application object can be added to the destination database 170 without error. Additionally, the Subscriber 120 modifies the selected application object's attributes as needed to accommodate the new environment in which the selected application object is stored. For example, if the selected application object contains an attribute that includes a DN of an application object associated with the selected application object, then the Subscriber 120 creates a new DN and sets the attribute to the new DN.

After selecting an application object from the distribution package and performing the steps describe above, the Subscriber 120 repeats the above described process until all application objects in the distribution package have been selected and added to the destination database 170. Further, the Subscriber 120 stores onto a non-volatile storage medium 180 (e.g., the subscriber's hard disk or other storage medium) the files included in the distribution package.

Figure 3:
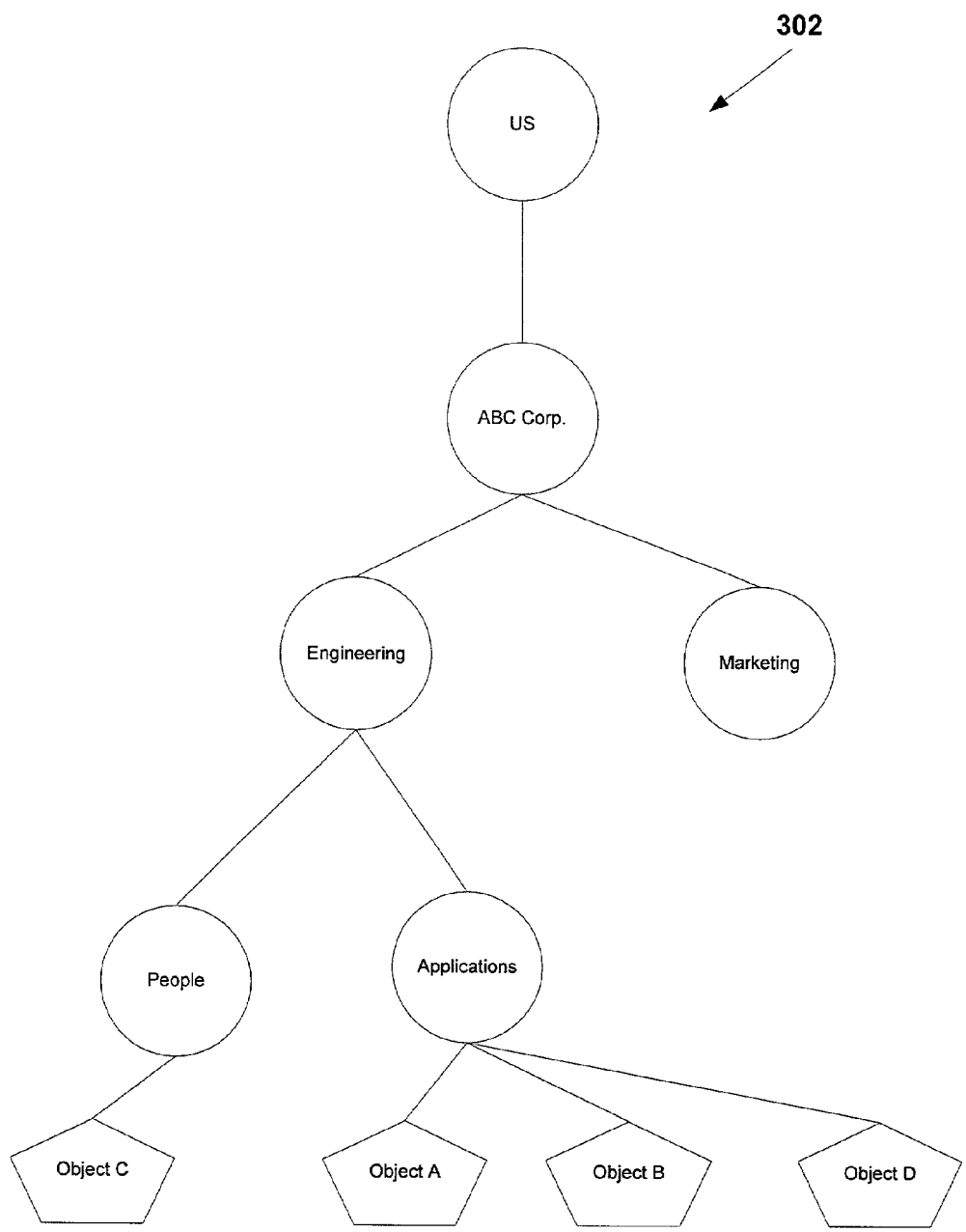
FIG. 3 illustrates an example source directory.
Figure 4:
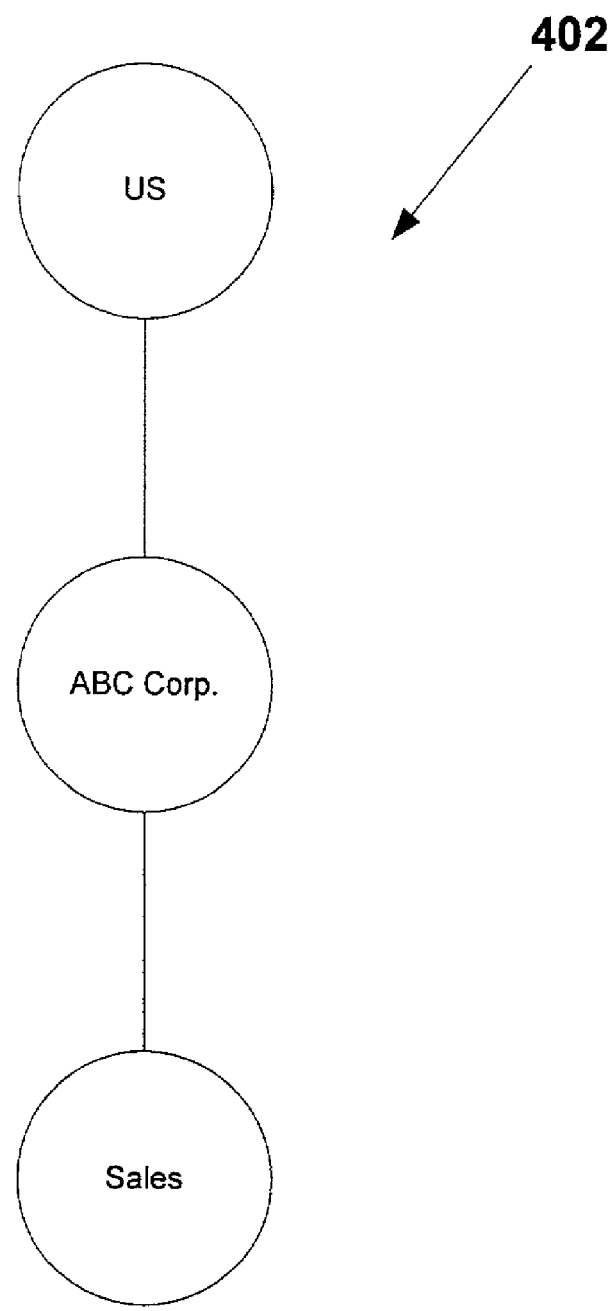
FIG. 4 illustrates an example Subscriber destination directory.
Figure 5:
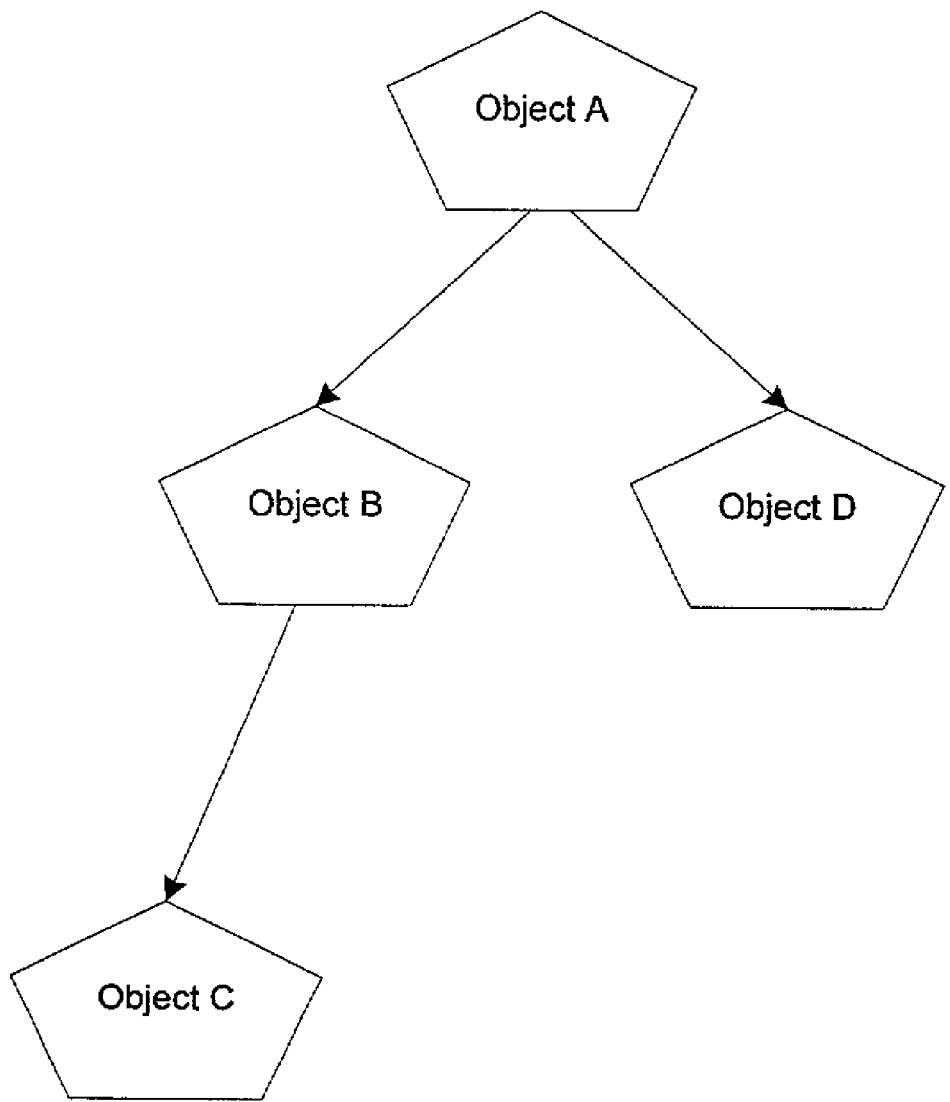
FIG. 5 illustrates the relationship among objects stored in the source directory.
Figure 6:
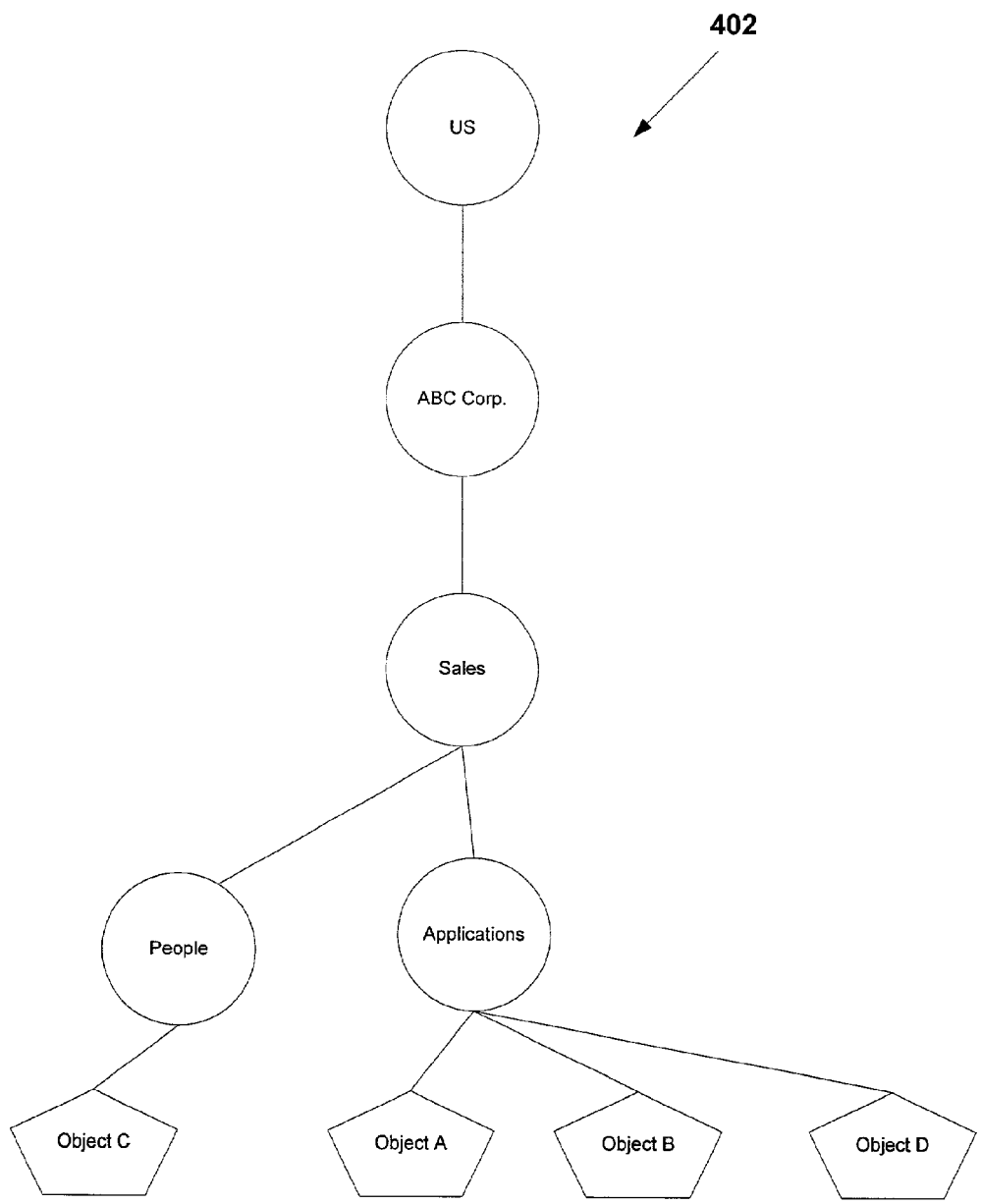
FIG. 6 illustrates the destination directory after the object A is distributed to the Subscriber.

For illustration, FIG. 3 shows an example source database 302. In this example, source database 302 is a directory that includes the following application objects: object A, object B, object C, and object D; and FIG. 4 shows an example Subscriber destination database 402. FIG. 5 shows the relationship among object A, object B, object C, and Object D. As shown in FIG. 5, object A references object B and object D; object B references object C. Thus, objects B, C and D are all associated with object A, and object C is associated with object B. It should be noted that object C is indirectly associated with object A. It should also be noted that if other objects were associated with object C, then those other objects would be considered to be associated with object A because object C is associated with object A. Thus, the number of objects that may be associated with object A can be N, where N is a number greater than or equal to zero. In other words, the objects that are associated with object A may have an "X" width and a "Y" depth, where X and Y are numbers greater than or equal to zero. If an administrator selects object A for distribution to the Subscriber and specifies the following source-root-context: "Engineering.ABC Corp.US", and the Subscriber's working-context is set to "Sales.ABC Corp.US", then FIG. 6 shows destination directory 402 after object A is distributed to the Subscriber. As shown in FIG. 6, not only is object A distributed to the Subscriber and inserted into database 402, but also objects B, C and D are automatically distributed to the Subscriber and inserted into database 402.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing a distribution package received from a source database, the distribution package comprising two or more application objects from within the same source root context, without including subscriber information in the application objects, and wherein the distribution package is distributed to multiple subscribers, comprising:
   receiving at a subscriber device, the distribution package comprising the two or more application objects, wherein each application object includes a distinguished name that identifies a pathname within the source database of where the application object is from;
   accessing a subscriber object upon receiving the distribution package;
   determining a working-context stored within the subscriber object, wherein the working-context identifies a node within the subscriber's destination database under which the application object is to be stored;
   selecting at least a first application object from the two or more application objects included in the distribution package;
   obtaining from the distribution package a relative identifier for the first application object or if a relative identifier is not included with the distribution package, creating the relative identifier for the first application object by subtracting the source root context from the distinguished name;
   appending the relative identifier to the working-context, to create a second identifier which identifies a pathname within the subscriber's destination database; and
   storing the selected first application object to the location within the destination database identified by the second identifier.

2. The method of claim 1, wherein the source database is a directory, the relative identifier comprises a first distinguished name and the second identifier comprises a second distinguished name different than the first distinguished name.

3. The method according to claim 1, wherein upon the second identifier not existing in the destination database, the method further comprises creating a container object.

4. The method according to claim 3, further comprises adding the container object to the destination database.

5. The method according to claim 4, further comprising modifying the selected first application object attributes by the subscriber device to accommodate a new environment in which the selected application object is stored.

6. The method according to claim 5, wherein upon the selected first application object including an attribute having an identifier of an object associated with the selected first application object, the method further comprises creating a relative identifier for the associated object and setting the attribute to the relative identifier.

7. The method according to claim 5, wherein upon the distribution package being tasked to maintain the database structure, the method further comprises creating a relative identifier by appending the relative identifier to the working context.

8. The method according to claim 7, wherein if the distribution package is not tasked to maintain the database structure, then the relative identifier is created by appending a last component of the distinguished name to the working-context.

9. The method according to claim 1, further comprising storing the object included in the distribution package onto a non-volatile storage medium.

10. A system for processing a distribution package received from a source database, the distribution package comprising two or more application objects from within the same source root context, without including subscriber information in the application objects, and wherein the distribution package is distributed to multiple subscribers, comprising:
a subscriber software module; and
a subscriber object, wherein
the subscriber software module is operable to:
receive, at a subscriber device, the distribution package comprising the two or more application objects wherein each application object includes a distinguished name that identifies a pathname within the source database of where the application object is from;
access a subscriber object upon receiving the distribution package;
determine a working-context stored within the subscriber object wherein the working-context identifies a node within the subscriber's destination database under which the application object is to be stored;
select at least a first application object from the two or more application objects included in the distribution package;
obtain from the distribution package a relative identifier for the first application object or if a relative identifier is not included with the distribution package, creating the relative identifier for the first application object by subtracting the source root context from the distinguished name;
append the relative identifier to the working-context to create a second identifier which identifies a pathname within the subscriber's destination database; and
storing the selected first application object to the location within the destination database identified by the second identifier.

11. The system of claim 10, wherein the source database is a directory, the relative identifier comprises a first distinguished name and the second identifier comprises a second distinguished name different than the first distinguished name.

12. The system according to claim 10, wherein upon the second identifier not existing in the destination database, the subscriber software module is further operable to create a container object.

13. The system according to claim 12, wherein the subscriber software module is further operable to add the container object to the destination database.

14. The system according to claim 13, wherein the subscriber software module is further operable to modify the selected first application object attributes by the subscriber device to accommodate a new environment in which the selected first application object is stored.

15. The system according to claim 14, wherein upon the selected first application object including an attribute having an identifier of an object associated with the selected first application object, the subscriber software module is further operable to create a third identifier for the associated object and setting the attribute to the third identifier.

16. The system according to claim 10, wherein the subscriber software module is further operable to store the object included in the distribution package onto a non-volatile storage medium.

17. A computer program product for processing a distribution package received from a source database, wherein the distribution package comprising two or more application objects from within a source root context without including subscriber information in the application objects, and wherein the distribution package is distributed to multiple subscribers, the computer program product being embodied in one or more computer readable mediums and comprising computer instructions for:
receiving at a subscriber device, the distribution package comprising the two or more application objects, wherein each application object includes a distinguished name that identifies a pathname within the source database of where the application object is from;
accessing a subscriber object upon receiving the distribution package;
determining a working-context stored within the subscriber object wherein the working-context identifies a node within the subscriber's destination database under which the application object is to be stored;
selecting a first application object from the two or more application objects included in the distribution package;
obtaining from the distribution package a relative identifier for the first application object or if a relative identifier is not included with the distribution package, creating the relative identifier for the first application object by subtracting the source root context from the distinguished name;
appending the relative identifier to the working-context to create a second identifier which identifies a pathname within the subscriber's destination database; and
storing the selected first application object to the location within the destination database identified by the second identifier.

18. The computer program product according to claim 17, wherein the source database is a directory, the relative identifier comprises a first distinguished name and the second identifier comprises a second distinguished name different than the first distinguished name.

19. The computer program product according to claim 17, wherein upon the second identifier not existing in the destination database, the computer instructions further include instructions for creating a container object.

20. The computer program product according to claim 19, wherein the computer instructions further include instructions for adding the container object to the destination database.

21. The computer program product according to claim 20, wherein the computer instructions further include instructions for modifying the selected first application object attributes by the subscriber device to accommodate a new environment in which the selected first application object is stored.

22. The computer program product according to claim 21, wherein upon the selected first application object including an attribute having an identifier of an object associated with the selected first application object, the computer instructions further include instructions for creating a third identifier for the associated object and setting the attribute to the third identifier.

23. The computer program product according to claim 21, wherein upon the distribution package being tasked to maintain the database structure, the computer instructions further include instructions for creating a third identifier by appending the relative identifier to the working context.

24. The computer program product according to claim 23, wherein if the distribution package is not tasked to maintain the database structure, then the computer instructions include instructions for creating the relative identifier by appending a last component of the distinguished name to the working-context.

25. The computer program product according to claim 17, wherein the computer instructions further include instructions for storing the object included in the distribution package onto a non-volatile storage medium.

\* \* \* \* \*